United States Patent [19]

Hudson et al.

[11] Patent Number: 5,023,404
[45] Date of Patent: Jun. 11, 1991

[54] WIRING DUCT

[75] Inventors: Hugh F. Hudson, Wauwatosa, Wis.; Joseph F. Munsch, Boulder Creek; Joseph A. McArdle, Mountain View, both of Calif.; Jackie L. Kammer, Baraboo; Robert W. Jermyn, Mukwonago, both of Wis.

[73] Assignee: Johnson Service Company, Milwaukee, Wis.

[21] Appl. No.: 406,772

[22] Filed: Sep. 13, 1989

[51] Int. Cl.$^5$ ............................................. H02G 3/04
[52] U.S. Cl. .................................... 174/97; 174/68.3; 361/428; D13/155
[58] Field of Search ...................... 174/68.3, 72 A, 97, 174/101; 361/428; 379/326, 327; 138/115, 116, 117

[56] References Cited

U.S. PATENT DOCUMENTS 3,403,220 9/1968 Riedel et al. .................. 174/72 A X
3,911,328 10/1975 Haury et al. .................. 174/72 A X

FOREIGN PATENT DOCUMENTS 2515573 4/1976 Fed. Rep. of Germany ... 174/72 A
2545398 4/1977 Fed. Rep. of Germany ... 174/72 A
1135514 12/1956 France ................................. 174/97
1375765 9/1964 France ............................. 174/68.3
1409853 7/1965 France ................................. 174/97

Primary Examiner—Laramie E. Askin
Attorney, Agent, or Firm—Foley & Lardner

[57] ABSTRACT

A top entry top exit wiring duct for routing conductors to terminal devices, the duct including a base, side walls provided along each side of the base forming an open channel, a partial top wall formed by a number of fingers spaced apart to form open ended exit slots for the conductors and having distal ends extending toward the other of the side walls, the distal ends being spaced from the other of the side walls a distance sufficient to define a top entry opening into the duct for the conductors.

17 Claims, 7 Drawing Sheets

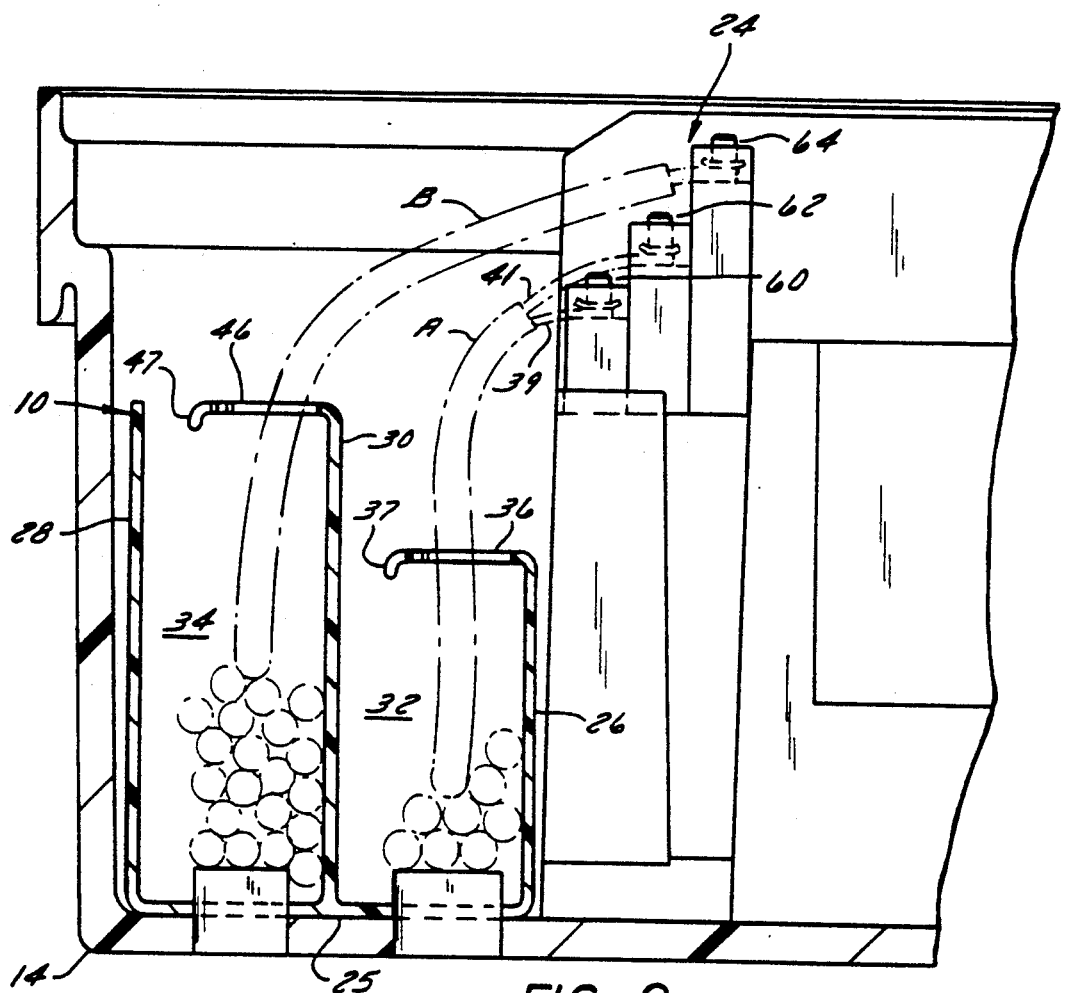
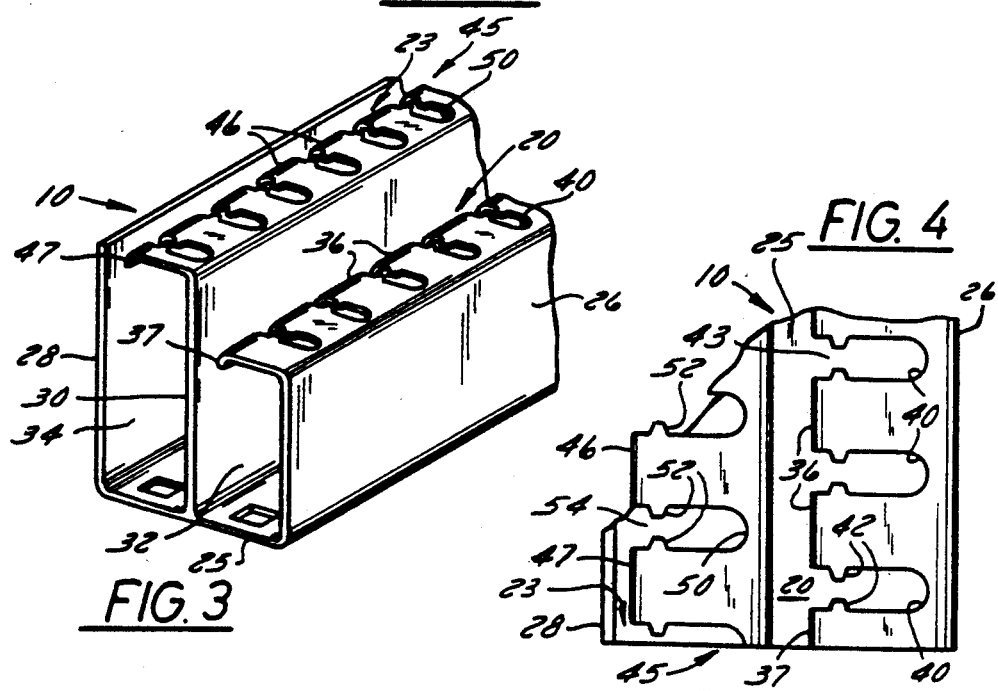
FIG. 2
FIG. 3
FIG. 4

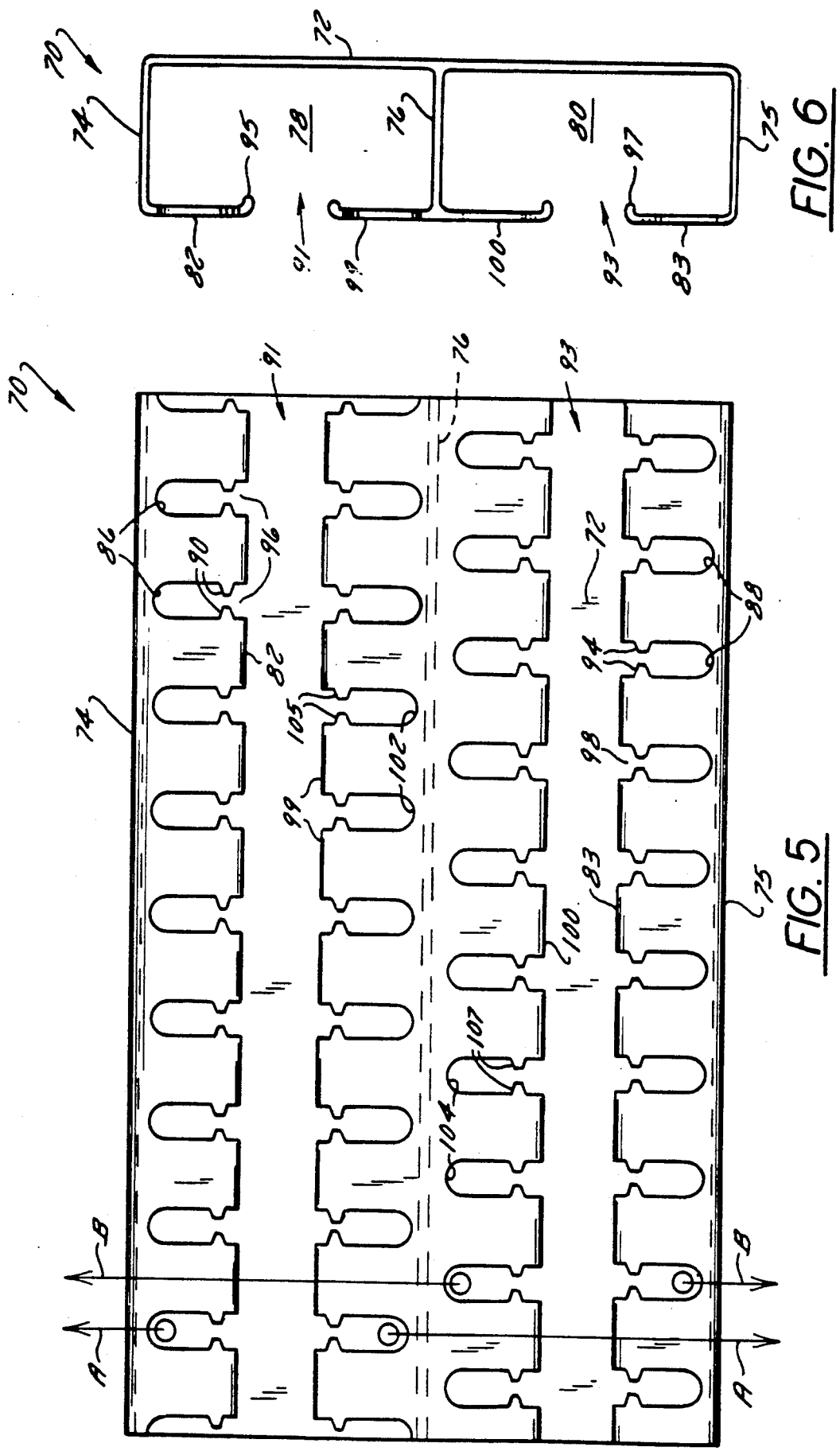

WIRING DUCT

BACKGROUND OF THE INVENTION

1. Field of the Invention

The present invention relates to a top entry top exit wiring duct or wireway for routing cables, wires or tubes to terminal devices.

2. Description of the Prior Art

Wiring ducts in the form of U-shaped channels are known for use in holding, supporting, retaining and distributing conductors in an orderly manner to terminal devices for components located on a common surface area. It is the generally accepted procedure and for the sake of neatness, convenience and safety and ease of repair, to place the conductors in one or more ducts which must be spaced from the terminal devices to allow room for preparing or dressing and attaching the conductors to the terminal devices. The U-shaped channels are generally made of a relatively flexible plastic material having good insulation quality. The U-shaped channels are attached to the panel frame by way of conventional fasteners passed through appropriate mounting holes disposed in the base of the channels, or they are held in position by means of clips or the like. The conductors required for a particular installation are routed to the terminal devices generally through slots in the sidewalls of the ducts. The side wall slots may be in the form of circular holes or elongated slits which are open to the edge of the channel side wall, preferably by way of a restricted passage. Covers are provided to enclose the top of the duct to retain the conductors in the duct. These covers are often difficult to assemble due to bulging of the side walls of the ducts. Patents representative of this type of duct include the following: U.S. Pat. Nos.: 1,639,310; 2,896,009; 3,321,571; 3,631,300; 3,763,401; 3,890,459; 3,906,146; 3,909,505; and 4,092,700.

One of the major problems associated with mounting components in this manner is that the terminals to which the electrical conductors are attached are close to the mounting surface, and the high side walls of the wiring duct restrict free access to the terminals, making the task of attaching the wires very difficult. This is due to the nature of the side exit type ducts which require a space between the duct and the particular terminal device in order to allow for side exit of the conductors regardless of the location of the terminal device or the elevation of the duct side walls. In order to alleviate this problem, the ducts are spaced from the terminal devices a distance sufficient to allow room for the technician to place his hand between the duct and the terminal device, thus increasing the overall size of the area required to support the conductor and the duct. These ducts are generally single channel type and additional ducts are required where separation of conductors is required.

SUMMARY OF THE INVENTION

The present invention, therefore, relates to a top entry top exit duct which reduces the overall area required by the ducts by the elimination of the necessity for providing space between the duct and the termination device. This has been accomplished by providing routing ducts which are molded or extruded to form an integral unit having a base, side walls and a partial top wall. The sidewalls of the duct are closed and the partial top wall is in the form of fingers which are spaced apart to form top exit openings for dressing the conductors for termination to a specific laterally corresponding terminal device located next to the routing duct. The distal ends of the fingers are spaced from the opposite distance sufficient to form a top entry opening for routing the conductors into the channel or channels in the duct. The fingers are provided with ribs or ridges on the distal end to provide individualized retention of the conductors in the openings between the fingers.

One of the primary advantages of the present invention is the reduction in the overall size of the surface area required for the ducts by providing top entry and top exit openings in the duct which allow for the placement of the ducts immediately adjacent to the terminal devices.

One of the innovative variations of the present invention is the provision of multiple channels in the duct to separate the various types of conductors in order to meet certain code requirements.

Another variation of the present invention is the provision of multi-channeled ducts having offset top exit openings to allow for crisscrossing of the conductors without overlapping of the conductors from one channel over the conductors in the other channel when connected laterally to terminal devices on one or both sides of the duct.

Another advantage of this invention is the elimination of a separate cover for holding the conductors in the duct and thereby reducing assembly time and cost.

A further variation of the invention is the provision of horizontal barriers on the top of the duct to isolate the conductors exited from one channel from conductors exited from another channel.

Another advantage of the invention is the provision of fingers on both side walls and on both sides of the intermediate wall for routing conductors laterally to terminal devices on both sides of the duct.

Other principal advantages, features and variations of the invention will be apparent to those skilled in the art upon review of the following detailed description, claims and drawings.

BRIEF DESCRIPTION OF THE DRAWINGS

FIG. 2 is a view taken on line 2—2 of FIG. 1 showing the relationship of the routing duct with the terminal devices.

FIG. 3 is a perspective view of a portion of a dual channel duct.

FIG. 4 is a top view of a portion of the duct.

FIG. 5 is a top view of a dual channel duct which can be placed between two terminal devices.

FIG. 6 is an end view of the dual channel duct shown in FIG. 5.

Figure 1:
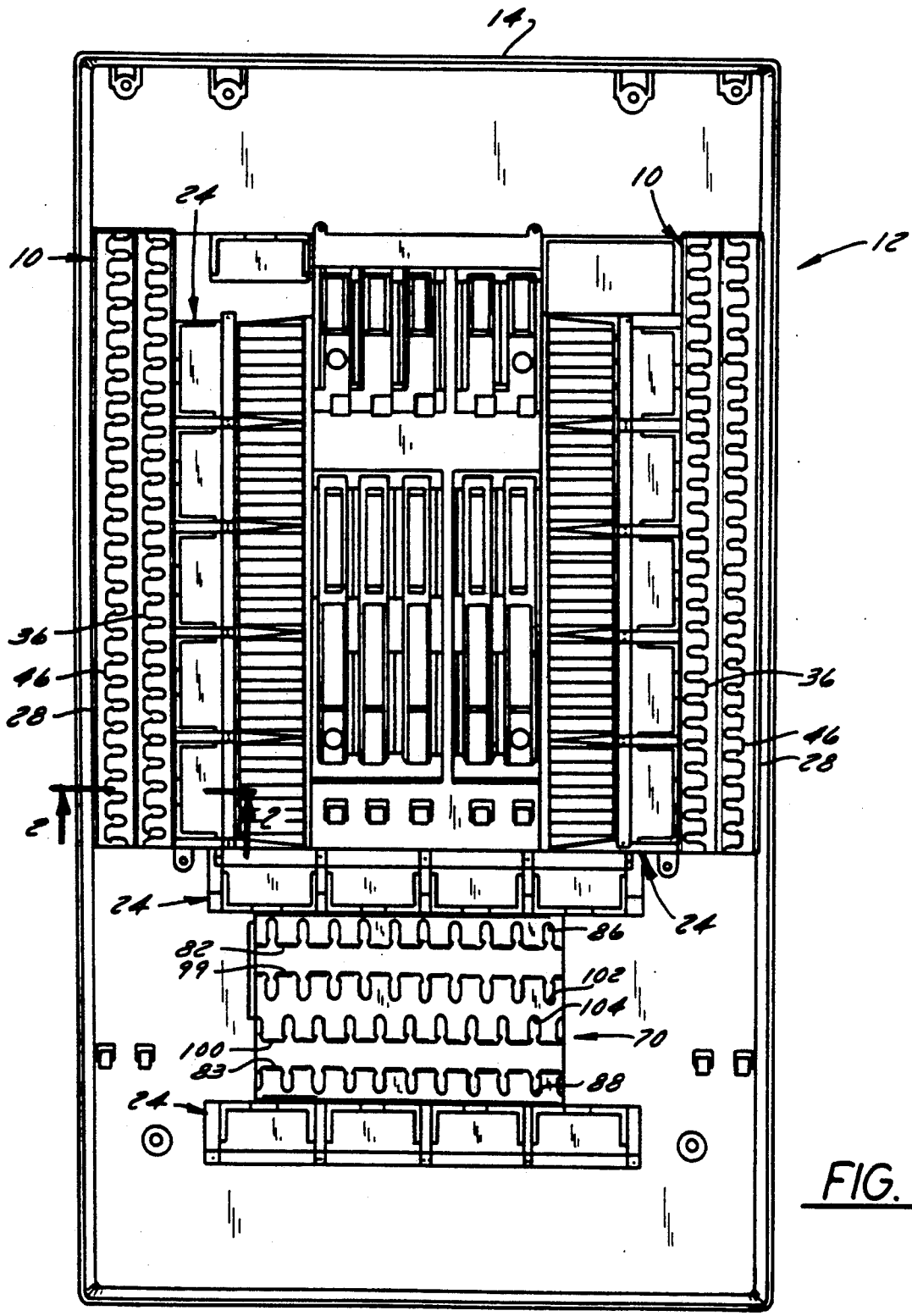
FIG. 1 is a front elevation view of an example of a control panel utilizing the duct according to the present invention.

Before describing one embodiment of the invention in detail, it is to be understood that the invention is not limited in its application to the details of construction and the arrangement of components set forth in the following description or illustrated in the drawings. The invention is capable of other enbodiments and of being practiced and carried out in various ways. Also, it is to be understood that the phraseology and terminology employed herein is for the purpose of description and should not be regarded as limiting.

DETAILED DESCRIPTION OF THE PREFERRED EMBODIMENTS

The wiring duct 10 according to the present invention is used to provide routing of the conductors which are to be connected to terminal devices on a control panel 12 as shown in FIG. 1. "Conductors" as used herein refer to electrical cables, wires or conduits as well as hydraulic or pneumatic tubing and fiber optic strands. "Terminal devices" as used herein refer to any device or component to which a conductor is to be attached, such as a terminal block, spigot, spade lug, binding screw and the like.

The control panel normally includes a base or frame 14 for direct wall mounting. The terminal devices are shown in the form of terminal blocks 24 which are provided immediately adjacent to the ducts 10 for connecting the conductors routed through the ducts 10 to the terminal blocks 24. The terminal blocks 24, as shown in FIG. 2, are provided with three rows of terminals 60, 62 and 64.

In accordance with the invention, the ducts 10 are preferably formed as integral units from rigid plastic material. The duct 10, as seen in FIGS. 2-4, is a dual channel, dual elevated, uni-lateral duct. The duct includes a base 25, side walls 26 and 28, and an intermediate wall 30 which separates the duct 10 into two channels 32 and 34. A partial top wall is formed on the duct 10 by means of a first set of fingers 36 provided at the top of side wall 26. The fingers 36 are located in a generally parallel relation to the base 25 and extend toward the intermediate wall 30. The distal ends 37 of fingers 36 terminate at a distance from the intermediate wall sufficient to form an elongate top entry opening 20 for conductors A into the channel 32. The fingers 36 are spaced apart a distance sufficient to provide top exit slots 40 between each pair of fingers for routing the wires 39 and 41 of conductors A to the terminals 60 and 62 on the terminal block 24. Means are provided at the entrance to each of the slots 40 for restricting or narrowing the opening 43 into each slot 40 to retain the cables in the slots. Such means is in the form of tabs 42 provided on each of the fingers 36. The tabs 42 tapered to provide a lead in and lead out function the conductors A in the slots 40. Means are provided on the distal ends 37 of fingers 36 for retaining the conductors A in channel 32. Such means is in the form of downwardly extending ribs at the ends of the fingers 36.

The intermediate wall 30 is provided with a partial top wall 45 by means of a second set of fingers 46 which are also located generally parallel to the base 25 and extend toward the side wall 28. The distal ends 47 of the fingers 46 terminate at a distance from the side wall 28 sufficient to form an elongate top entry opening 23 for the conductors B into the channel 34. The fingers 46 are spaced apart a distance sufficient to form top exit slots 50 between the fingers 46 for routing the conductors B to the terminals 64 on the terminal block 24. It should be noted that the fingers 46 are located at a higher level than fingers 36 to separate or isolate the cables from one channel with the cables in another channel.

Means are provided at the entrances to slots 50 for restricting or narrowing the openings 54 into the slots 50 to retain the cables in the slots. Such means is in the form of tabs 52 provided on each of the fingers 46. The tabs 52 are also tapered to provide a lead in and lead out function for the conductors B in slots 50. Means are provided on the distal ends 47 of fingers 46 for retaining the conductors B in channel 34. Such means is in the form of downwardly extending ribs at the ends of the fingers 46.

It should be noted in FIG. 4 that the slots 40 are offset from the slots 50 to allow for crossing of the conductors B in channel 34 over the channel 32 without overlapping of the conductors A.

In the embodiment of the invention shown in FIGS. 5 and 6, a dual channel, uni-elevation, bilateral duct 70 is shown which can be used for connecting conductors A and B to terminal devices located on either side of the duct 70. The duct 70 includes a base 72, side walls 74, 75 and an intermediate wall 76. The intermediate wall 76 separates the wiring duct 70 into channels 78 and 80. Each of the side walls 74 and 75 includes a set of fingers 82, 83, respectively, which parallel the base 72 and extend inwardly toward the intermediate wall 76. The fingers 82 on side wall 74 are spaced apart to form top exit openings 86 and the fingers on side wall 75 are spaced apart to form top exit openings 88. Tabs 90 and 94 are provided on the distal ends of fingers 82 and 83, respectively, to narrow or restrict the entrances 96 and 98 into the openings 86 and 88. Means are provided on the distal ends of fingers 82 and 83 for retaining the conductors A and B in channels 78 and 80. Such means is in the form of ribs 95 and 97.

The intermediate wall 76 as noted above separates the duct into channels 78 and 80. Fingers 99 are provided on one side of wall 76 and fingers 100 are provided on the opposite side of the wall 76. The fingers 99 and 100 parallel the base 72 and extend outwardly toward the fingers 82 and 83, respectively. The ends of the fingers 99 and 100 are spaced from the ends of fingers 82 and 83, respectively, to form top entry openings 91 and 93 into channels 78 and 80, respectively. The fingers 99 are spaced to form top exit openings 102 and the fingers 100 are spaced to form top exit openings 104. It should be noted that the openings 86 and 102 into channel 78 are offset, or staggered from the openings 88 and 104 into channel 80 to separate conductors A from channel 78 from conductors B from channel 80.

Means are provided at the open ends of openings 102 and 104 to restrict the entrances into the openings. Such means is in the form of tabs 105 and 107, respectively, which provide a lead in and a lead out function as described above. With this arrangement, conductors A provided in channel 78 can be routed to terminal devices located immediately adjacent to side wall 74 through openings 86 and to terminal devices located immediately adjacent to side wall 75 through openings 102. Conductors B provided in channel 80 can be routed to the terminal devices next to side wall 75 through openings 88 and to terminal devices next to side wall 74 through openings 104. Since the openings 104 and 102 are staggered, crossing of the conductors A in channel 78 to the terminal devices on the opposite side of the duct will not interfere with conductors B routed from channel 80 to the terminal devices on the other side of the duct. Although fingers 99 and 100 are shown at the same level as fingers 82 and 83, the intermediate wall can be raised as shown in FIG. 2 so that the conductors A and B cross over the top of the cables routed through openings 86 and 88.

Figure 7:
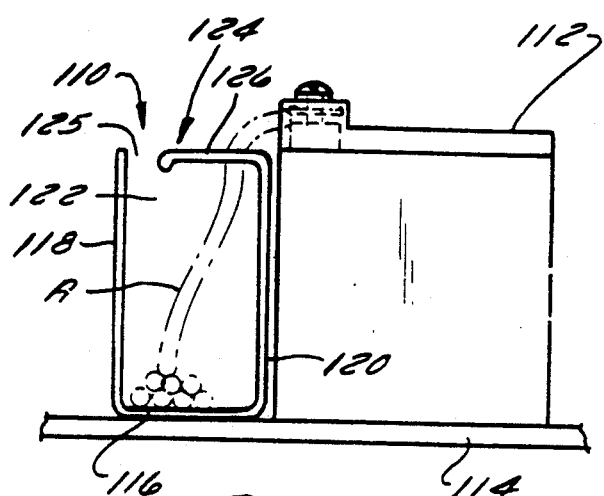
FIG. 7 is an end view of a unidirectional channel duct according to the invention for routing conductors to a terminal device on one side of the duct.
Figure 8:
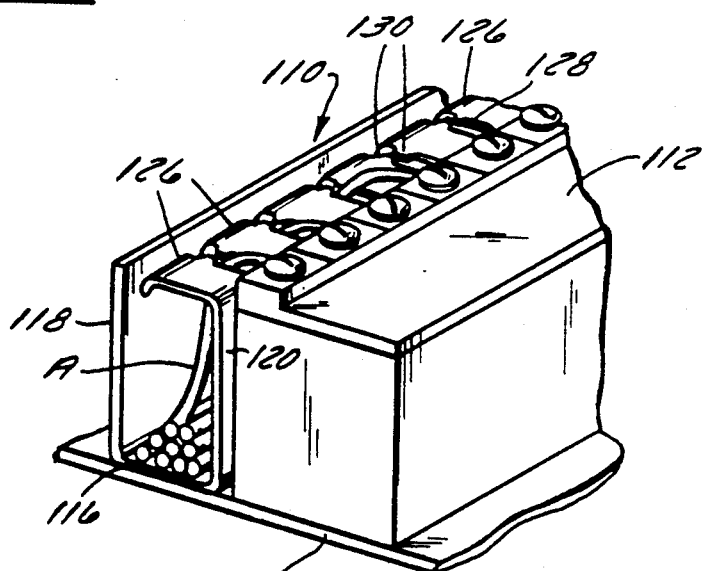
FIG. 8 is a perspective view of the duct of FIG. 7 showing the top exit opening of the cables to a terminal device.

Referring to FIGS. 7 and 8 a uni-channel, uni-lateral duct 110 is shown for connecting conductors A to terminal blocks 112. The duct 110 is shown positioned on a supporting surface 114 in abutting engagement or closely adjacent to the terminal device 112 to which the conductors are to be terminated. The duct 110 includes a base 116 and side walls 118 and 120 connected to the edges of t base 116 to form a channel 122 for conductors A. Means are provided for forming a partial top wall 124 on the upper edge of side wall 120. Such means is in the form of a number of fingers 126 having their distal ends extending toward but spaced from the side wall 118 to form a top entry opening 125 for the conductors A. The fingers 126 are spaced apart to form top exit openings 128 for connecting the conductors A to the terminal block 112. The entrance to each slot 128 is restricted by means of tapered tabs 130 to retain the cables in the slots.

Figure 9:
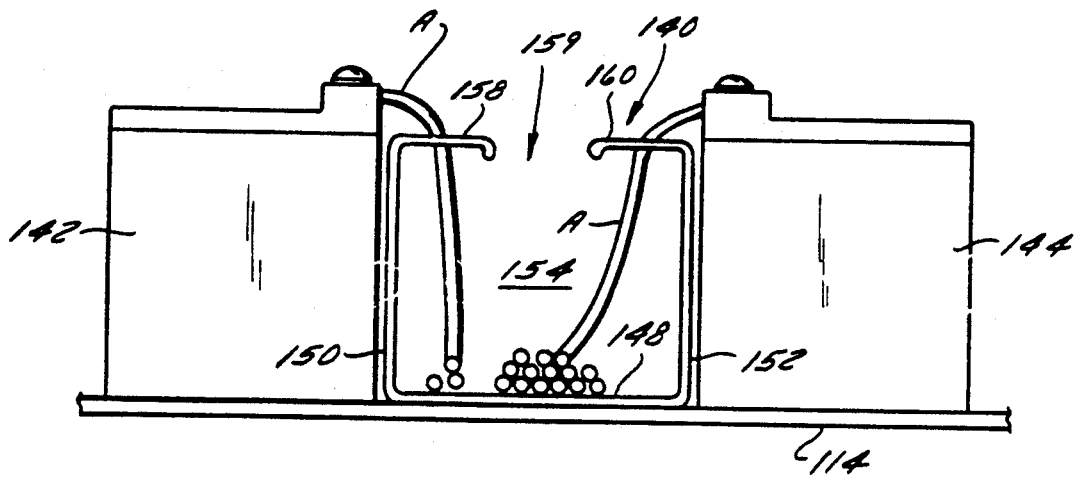
FIG. 9 is an end view of a single channel duct for routing cables laterally to both sides of the duct.
Figure 10:
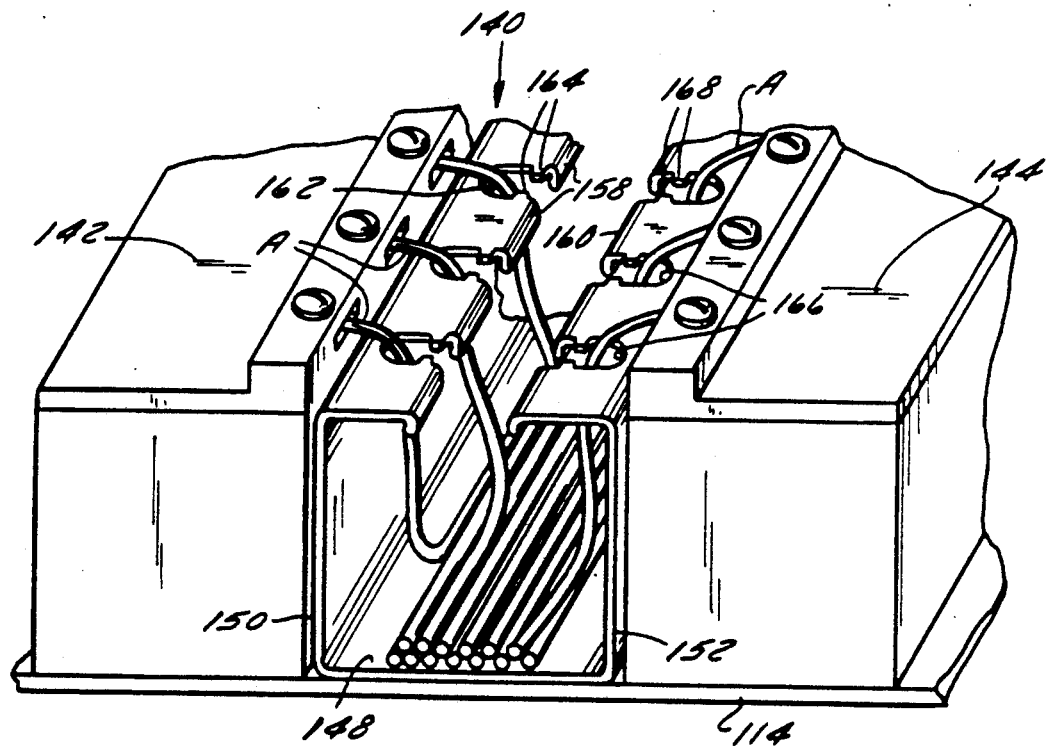
FIG. 10 is a perspective view of the duct of FIG. 9 showing the top exiting of the cables to terminal devices located on both sides of the duct.

Referring to FIGS. 9 and 10 a uni-channel bilateral duct 140 is shown for connecting conductors A to terminal blocks 142 and 144, located on each side of the wiring duct 140. The wiring duct 140 includes a base 148 and a pair of parallel side walls 150 and 152 formed on the edges of the bottom wall 148 to define a channel 154 for the cables. Means are provided for forming a partial top wall at the top of the wiring duct 140. Such means is in the form of a first set of fingers 158 provided on side wall 150 and a second set of fingers 160 provided on side wall 152. The distal ends of the fingers 158 and 160 are spaced apart to form a top entry opening 159 for the conductors A into channel 154. The fingers 158 are spaced apart to form top exit openings 162 which are narrowed at the open end by means of tabs 164. The fingers 160 are spaced apart to form top exit slots 166 which are narrowed at the open end by means of tabs 168. As seen in the drawing, the conductors A can be inserted into the duct through the top entry opening defined by the distal ends of the fingers 158 and 160 and can be exited from the channel 154 through the exit openings 162 and 166 for connection to the terminal blocks 142 and 144.

Figure 11:
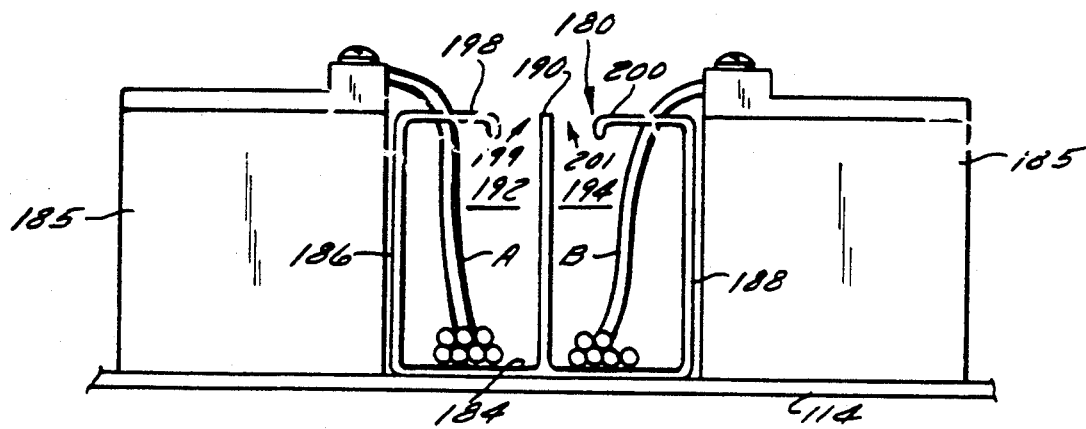
FIG. 11 is an end view of a double channel duct for routing cables to terminal devices on both sides of the duct.
Figure 12:
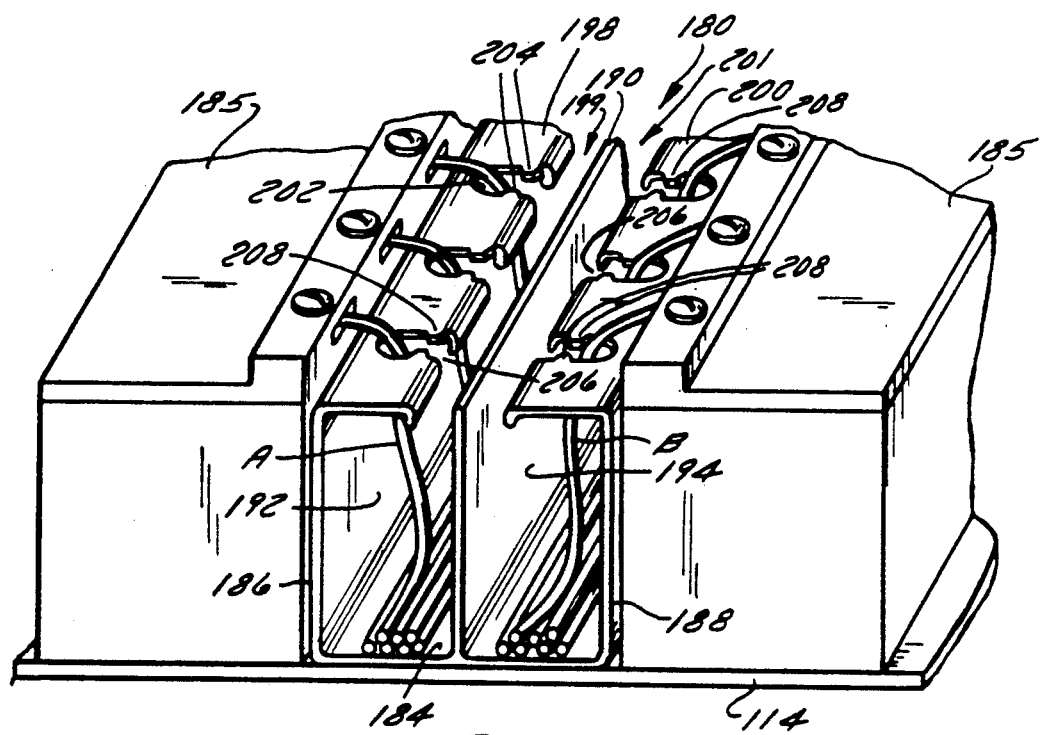
FIG. 12 is a perspective view of the duct of FIG. 11 showing the top opening for exiting of the cables to the terminal devices.

In the embodiment of the invention shown in FIGS. 11 and 12 a dual-channel, bilateral wiring duct 180 is shown for routing different types of conductors to terminal blocks 185 provided on both sides of the duct. In this embodiment the duct 180 includes a base 184, side walls 186 and 188 and an intermediate wall 190 which defines a first channel 192 and a second channel 194.

Cables A are routed through channel 192 and cables B are routed through channel 194. The channel 192 is closed at the top by means of a partial top wall which is formed on the side wall 186 by a first set of fingers 198 which extend toward the intermediate wall 190. The distal ends of the fingers 198 are spaced from the intermediate wall 190 to form a top entry opening 199 into channel 192. The fingers 198 are spaced apart to form exit openings 202 which are narrowed at their open ends by tabs 204 to hold the conductors A in the slots 202. The channel 194 is closed at the top by means of a partial top wall formed on the side wall 188 by a second set of fingers 200 which extend toward the intermediate wall 190. The distal ends of the fingers 200 are spaced from the intermediate wall 190 to form a top entry opening 201 into channel 194. The fingers 200 are spaced apart to form exit openings 206 which are closed at their open ends by tabs 208 to hold the conductors B in the slots 206.

Figure 13:
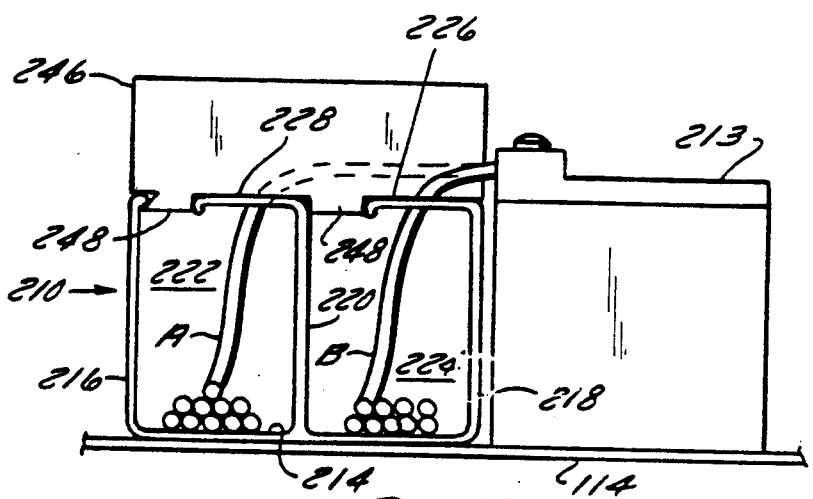
FIG. 13 is an end view of a double channel duct having conductors exited to one side of the duct with a horizontal separator mounted on the top of the duct to separate the conductors in one channel from conductors in the other channel.
Figure 14:
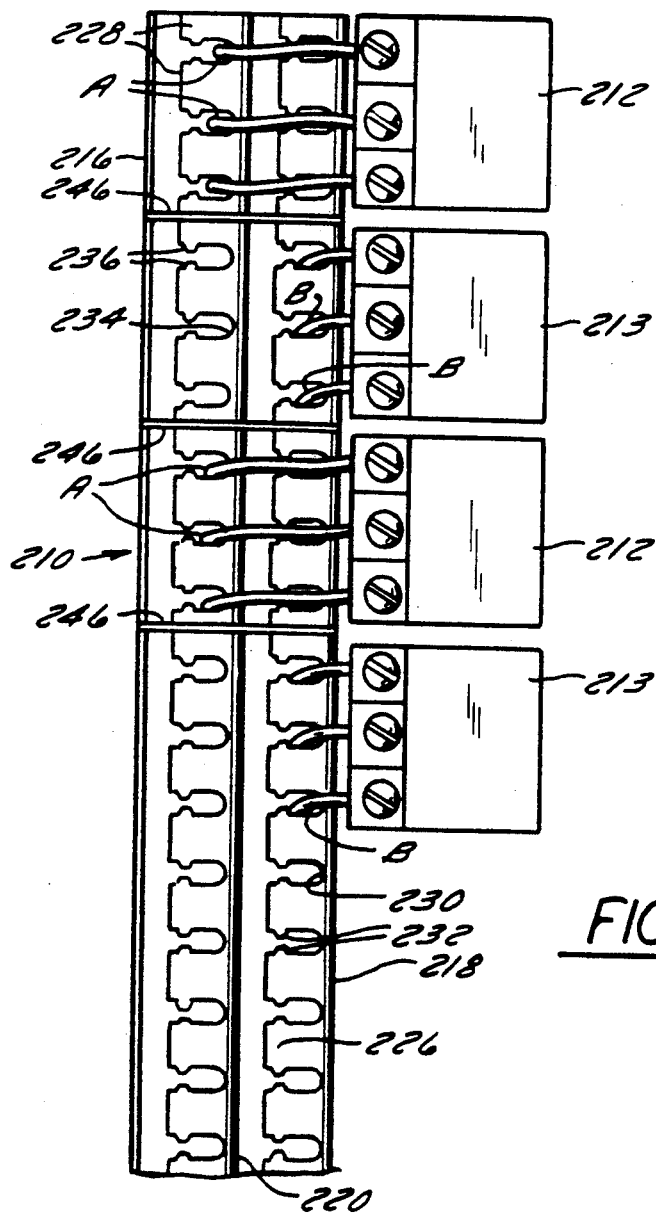
FIG. 14 is a top view of the double channel duct in FIG. 13 showing the top exiting of the cables laterally to a terminal device on one side of the duct with the cable separators spaced on the top of the duct.

In the embodiment of the invention as seen in FIGS. 13 and 14 a dual channel, uni-lateral duct 210 is shown for routing conductors A to high voltage terminal blocks 212 and conductors B to low voltage terminal blocks 213 which are located on the same side of the duct 210 as terminal blocks 212. The duct 210 includes a base wall 214 having side walls 216 and 218 mounted in a parallel spaced relation along the edges of the bottom wall 214. An intermediate wall 220 is provided on the base 214 intermediate the side walls 216 and 218 to define parallel channels 222 and 224. A partial top wall is provided over channel 224 by means of a first set of fingers 226 which are provided on side wall 218 and extend part way across channel 224 toward the intermediate wall 220. The distal ends of the fingers 226 are spaced from the intermediate wall 220 to form a top entry opening for routing the conductors B into channel 224. A partial top wall is formed over channel 222 by means of a second set of fingers 228 which are provided on intermediate wall 220 and extend toward the side wall 216. The fingers 228 are spaced from side wall 216 a distance sufficient to form a top entry opening for routing conductors A into channel 222.

The fingers 226 are spaced apart to form top exit slots 230 which are narrowed at their open ends by tabs 232. The fingers 228 are spaced apart to form top exit slots 234 which are narrowed at their open ends by tabs 236. As shown in FIG. 14 the cables A are connected to high voltage terminal blocks 212 and the cables B are connected to low voltage terminal blocks 213.

In order to meet conductor separation requirements, the high voltage cables A are separated from the low voltage cables B by means of cross duct separator or barrier plates 246 which are mounted on the top of the wiring duct 210 as shown in FIGS. 13 and 14. The plates 246 are formed of a dielectric material and include tabs 248 which fit in the spaces between the fingers 228 and the wall 216 and the fingers 226 and the intermediate wall 220. The fingers have sufficient stiffness to allow the tabs to be snapped into position to support the separator plates between the cables A and the cables B. The barrier plates 246 are used to isolate the high voltage cables A from the low voltage cables B between the point of top exit from the duct to termination with the terminal blocks 212 and 213.

Thus, it should be apparent that there has been provided, in accordance with the invention, a wiring duct that fully satisfies the aims and advantages set forth above. While the invention has been described in conjunction with specific embodiments thereof, it is evident that many alternatives, modifications, and variations will be apparent to those skilled in the art. Accordingly, it is intended to embrace all such alternatives, modifications and variations as fall within the spirit and broad scope of the appended claims.

The embodiments of the invention in which an exclusive property or privilege is claimed are defined as follows:

1. A top entry top exit routing duct for routing a plurality of separate conductors to terminal devices, said duct comprising a bottom wall, side walls and an intermediate wall separating said duct into first and second channels for separating the conductors; a first partial top wall formed on one of said side walls, said first partial top wall including a first set of fingers having distal ends extending toward said intermediate wall to form a first top entry opening into said first channel and being spaced from each other to form a first set of open ended top exit slots, and a second partial top wall on said intermediate wall, said second partial top wall including a second set of fingers having distal ends extending toward the other of said side walls to form a second top entry opening into said second channel and being spaced from each other to form a second set of open ended top exit slots, whereby conductors can be routed into said first and second channels, respectively, through said first and second top entry openings and conductors in said first channel can be exited through said first set of top exit slots, and conductors in said second channel can be exited through said second set of top exit slots for connection to terminal devices.

2. The duct according to claim 1 wherein said slots of said first set of top exit slots are offset from said slots of said second set of top exit slots.

3. The duct according to claim 2 wherein means are provided on said distal ends of said first and second sets of fingers for retaining conductors in said channels.

4. The duct according to claim 3 wherein said first set of fingers is lower than said second set of fingers.

5. The duct according to claim 4 wherein said first and second sets of fingers include means for restricting the respective open ends of said slots of said first and second sets of top exit slots whereby conductors exiting through said slots are retained in said slots.

6. The duct according to claim 1 wherein said first and second sets of fingers are positioned at different levels to separate conductors from said first channel from conductors in said second channel.

7. A routing duct for channeling, routing and retaining conductors for termination to terminal devices located immediately adjacent to said routing duct, said routing duct comprising:
an elongated base,
side walls provided along each side of said base,
an intermediate wall provided on said base between said side walls to form an open channel between each side wall and said intermediate wall; and
a partial top wall formed over each channel by a plurality of fingers inwardly extending from each of said side walls toward said intermediate wall and a plurality of fingers outwardly extending from each side of said intermediate wall toward each of said side walls, each of said inwardly extending fingers having distal ends spaced from respective distal ends of said outwardly extending fingers to form a respective top entry opening into each of said channels,
said plurality of fingers extending from each of said side walls and each side of said intermediate wall being spaced apart from adjacent fingers to form top exit slots therebetween communicating with respective adjacent channels for selectably exiting various conductors on each side of said duct to terminal devices.

8. The duct according to claim 7 wherein the slots between fingers over one channel are offset from said slots between fingers over the other channel.

9. The duct according to claim 8 wherein said fingers forming the partial top wall over one channel are higher than said fingers forming the partial top wall over the other channel.

10. The duct according to claim 7 including insulating means mounted on selected fingers in a transverse relation to said intermediate wall for defining a plurality of exit passages for conductors in each of said channels.

11. A routing duct adapted to accept a plurality of conductors laid in side by side relationship along the length of the routing duct for termination to terminal devices located immediately adjacent to said routing duct comprising:
an elongated base and a pair of side walls, each integral with said base and free of openings, which base and side walls collectively define a channel for the conductors;
a partial wall integral with one of said side walls formed by a plurality of fingers generally parallel to said base and extending toward said other side wall, said plurality of fingers having distal ends spaced from said other side wall and forming a top entry opening to permit positioning of conductors within said routing duct, said fingers being spaced from adjacent fingers to form top exit slots between adjacent fingers for selectively exiting various conductors to terminal devices;
means on said distal ends for restricting the entrance to said slots, and insulating means mounted on selected fingers in a transverse relation to said side walls for defining a plurality of exit passages for conductors in said channel.

12. A routing duct adapted to accept a plurality of conductors laid in side by side relationship along the length of said routing duct for termination to terminal devices located immediately adjacent to said routing duct comprising:
an elongated base and a pair of side walls each integral to said base and free of openings, which base and side walls collectively define a channel for the conductors,
a partial top wall integral with said side walls formed by a plurality of fingers extending inwardly from each of said side walls, said plurality of fingers extending from one of said side walls having distal ends spaced from distal ends of said plurality of fingers extending from said other side wall and forming a top entry opening into said duct, said fingers extending from one side wall being higher than the fingers extending from said other side wall, and
said plurality of fingers extending from respective side walls being spaced from adjacent fingers to form top exit slots between adjacent fingers for selectively exiting conductors to terminal devices.

13. A routing duct adapted to accept a plurality of conductors laid in side by side relationship along the length of said routing duct for termination to terminal devices located immediately adjacent to said routing duct comprising:

an elongated base and a pair of side walls each integral to said base and free of openings, which base and side walls collectively define a channel for the conductors, a partial top wall integral with said side walls formed by a plurality of fingers extending inwardly from each of said side walls, said plurality of fingers extending from one of said side walls having distal ends spaced from distal ends of said plurality of fingers extending from said other side wall and forming a top entry opening into said duct, and said plurality of fingers extending from respective side walls being spaced from adjacent fingers to form top exit slots between adjacent fingers for selectively exiting conductors to terminal devices, and said routing duct including insulation means mounted on said fingers in a transverse relation to said side walls for defining separate exit passages for conductors in said channel.

14. A routing duct having a pair of separate channels adapted to receive conductors and a top entry opening into each channel comprising:

an elongated base and a pair of integral side walls, each integral with said base;

an intermediate wall spaced between said side walls and together with said base forming said pair of channels; and a partial top wall formed by a first group of fingers integral with and extending from one side wall toward said intermediate wall and a partial top wall formed by a second group of fingers integral with and extending from the other of said side walls toward said intermediate wall, said fingers each having distal ends spaced from said intermediate wall to form the top entry opening into each of said channels, said fingers extending from each respective side wall spaced from adjacent fingers to form top exit slots between adjacent fingers for selectively exiting conductors to terminal devices.

15. The duct according to claim 14 wherein said slots between said fingers over one channel are offset from said slots between said fingers over the other channel.

16. The duct according to claim 14 wherein said fingers forming the partial top wall over one channel are higher than said fingers forming the partial top wall over the other channel.

17. The duct according to claim 14 including insulation means mounted on said fingers in a transverse relation to said intermediate wall for defining a plurality of exit passages for conductors in each of said channels.

* * * * *